Aug. 21, 1962 J. G. HAILEY 3,049,893
THERMOSTATIC EXPANSION VALVE WITH CUT-OFF
Filed April 29, 1959 2 Sheets-Sheet 1
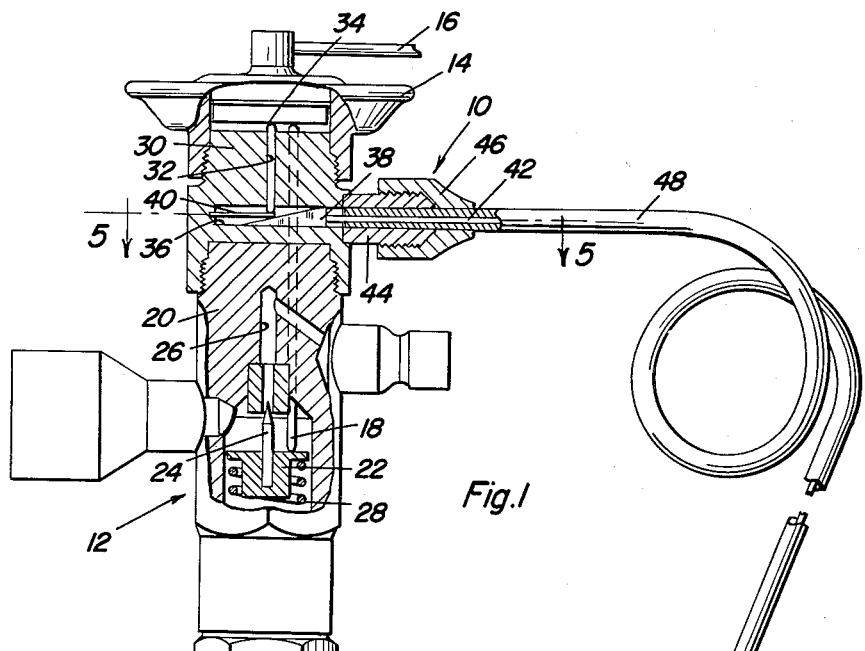
Fig.1
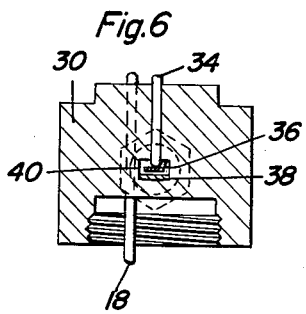
Fig.6
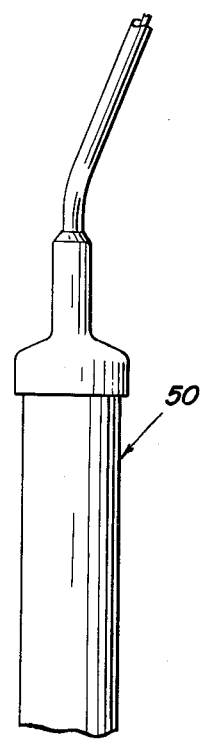
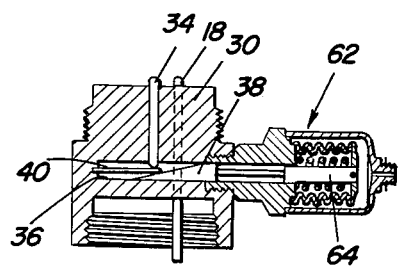
Fig.4
James G. Hailey
INVENTOR.
BY *Clarence A. O'Brien*
*and Harvey B. Jacobson*
Attorneys

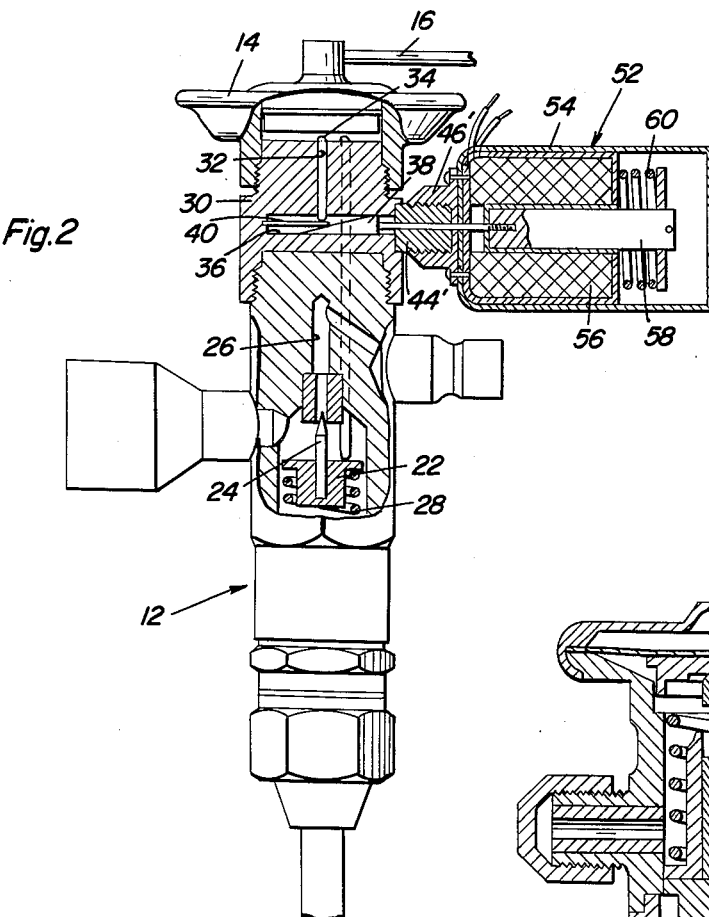
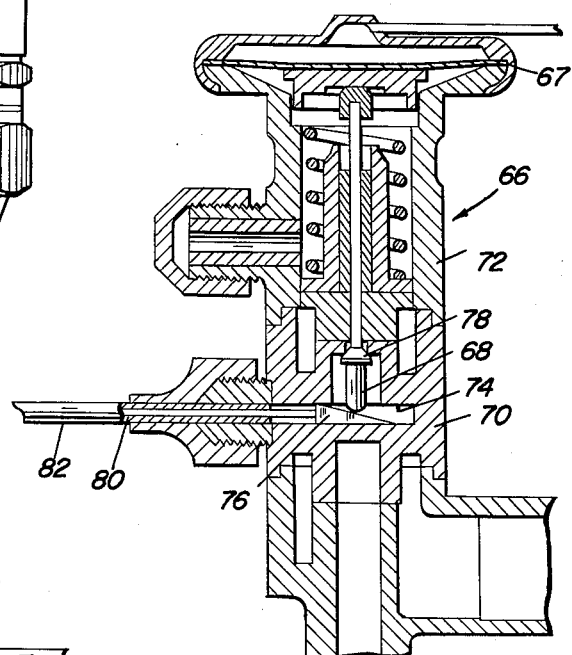
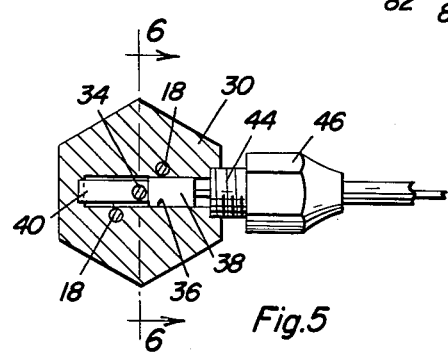

United States Patent Office 3,049,893
Patented Aug. 21, 1962

3,049,893
THERMOSTATIC EXPANSION VALVE
WITH CUT-OFF
James G. Hailey, 6005 Swiss Ave., Dallas, Tex.
Filed Apr. 29, 1959, Ser. No. 809,640
11 Claims. (Cl. 62—211)

The present invention generally relates to improved and novel structural arrangements in expansion valves normally used in mechanical refrigeration systems for metering the flow of liquid refrigerant into an evaporator in response to pressure and temperature conditions within the evaporator.

The primary object of the present invention is to provide a device for adding to the normal function of the thermostatic expansion valve, the additional function of the cutoff valve to completely interrupt the flow of refrigerant through the valve when desired regardless of conditions of pressure or temperature within the evaporator system.

In conventional forms of thermostatic expansion valves, a force which is used to open the valve is provided from the expansion of a refrigerant gas or gas-liquid mixture sealed in a sensing tube which is in communication through a capillary tube or small bore tube with a diaphragm of the expansion valve which is so arranged that pressure generated by expansion of gas in the sensing tube will operate to expand the diaphragm and then cause it to exert pressure upon the valve stem or upon push rods in the valve body, which tend to move the valve pin away from the valve orifice to allow refrigerant to pass through the valve thus lowering the temperature in the evaporator until the demand from the force exerted by the sensing tube has been satisfied.

From this explanation, the utility of the present invention will readily be apparent in that the present invention involves the introduction of a mechanical element for receiving the thrust of the diaphragm and transmitting it to the body of the valve rather than to the valve pin. Normally, the motion of the diaphragm tending to open the valve is opposed by pressure of an adjustable spring together with the internal pressure of the evaporator with the combined pressure being transmitted to the underside of the diaphragm and operating together to close the valve. A balance between opposing pressures determines the position of the valve pin within the orifice and the rate of flow of refrigerant through the valve.

Another object of the present invention is to provide a mechanical element which may be inserted between the diaphragm and the valve pin for taking the force from the diaphragm and transmitting it to the body of the valve thereby prohibiting any force being exerted on the valve pin thereby leaving the valve pin closed by virtue of the internal pressure in the evaporator and the spring which normally holds the valve pin closed with the valve being locked in closed position as long as the insertible element is inserted between the diaphragm and the valve pin before transmitting the force to the valve body.

Another object of the present invention is to provide a device in accordance with the preceding object in which the insertible element is wedge shaped and mechanically actuated.

A further object of the present invention is to provide an insertible wedge shaped member which is actuated by a solenoid.

Yet another object of the present invention is to provide an insertible element in the form of a wedge shaped member operated by a flexible wire.

A still further object of the present invention is to provide an insertible wedge shaped member actuated by a bellows responsive to change in pressure.

Another feature of the invention resides in its simplicity of construction, adaptation for various uses, installation without radical change in components and its relatively inexpensive manufacturing costs and maintenance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a sectional view of a thermostatic expansion valve illustrating the cutoff device of the present invention incorporated therein;

FIGURE 2 is a sectional view similar to FIGURE 1 illustrating a modified form of operator for the cutoff device;

FIGURE 3 is a sectional view similar to FIGURE 1 but illustrating a different form of thermostatic expansion valve;

FIGURE 4 is a partial sectional view illustrating another form of operating device for the cutoff member;

FIGURE 5 is a detailed sectional view taken substantially upon a plane passing along section line 5—5 of FIGURE 1 illustrating the details of construction thereof; and FIGURE 6 is a detailed sectional view taken substantially upon a plane passing along section line 6—6 of FIGURE 5 illustrating further structure of the cutoff member.

Referring now specifically to the drawings, the numeral 10 generally designates the cutoff device of the present invention employed with a conventional thermostatic expansion valve 12 as illustrated in FIGURE 1. The cutoff 10 will be assembled with the thermostatic expansion valve 12 without affecting the normal function of the valve. A diaphragm 14 is in communication with a temperature sensing bulb (not shown) by virtue of a capillary tube or small bore tube 16 connected with the top thereof. As is normal in thermostatic expansion valves, pressure generated in the sensing bulb due to a rise in temperature is transmitted to diaphragm 14 through tube 16. Pressure above the diaphragm 14 produces downward pressure exerted against a plurality of push rods 18 which extend through a vertical passage formed in body 20. The push rods 18 serve to open the valve 22 which includes a valve pin 24 received in an orifice 26 in the valve body 20 which controls the rate of flow of refrigerant through the valve 12. The valve member 22 is provided with a spring 28 extending between the same and an adjustable element in the valve body whereby the tension on the spring 28 may be adjusted for varying the pressure necessary to effect operation of the valve pin 24.

In the form of the invention illustrated in FIGURE 1, the cutoff 10 includes an adapter body 30 screw-threaded onto the top of the body 20 and receiving the diaphragm 14 with the body having a passage 32 receiving a pin 34 which is operated by the diaphragm 14 and which extends into a lateral passage 36 having a wedge shaped member 38 slidable therein. Also extending into the transverse passage 36 is a tongue 40 which is in the form of a spring member which engages the inner end of the pin 34 and also engages the inclined ramp or surface of the wedge shaped member 38.

The wedge shaped member 38 is connected to an elongated wire 42 which extends outwardly through a threaded adapter 44 which receives a fitting 46 on the end of a small tube 48 extending to a control device generally designated by the numeral 50 which will cause movement of the wire 42 which control device is responsive to the build up of thickness of ice on an ice bank, refrigeration coil or the like and the details of the control device 50 as illustrated in FIGURE 1 does not form a part of the present invention.

The operation of the wedge shaped member 38 may be effected in several different manners. In FIGURE 2, there is illustrated a solenoid 52 for controlling the operation of the wedge shaped member 38. In this form of the invention, the adapter 44' receives a fitting 46' on one end of a housing 54 for a solenoid coil 56 having a movable core 58 which is spring urged by springs 60 outwardly so that the wedge shaped member 38 will be retracted so that when the coil 56 is energized, the core will be drawn inwardly thus moving the wedge shaped member 38 inwardly and overcoming the force of the diaphragm and moving the diaphragm to a position to completely close the valve pin 24.

FIGURE 4 illustrates another modified form of cutoff mechanism which includes a Sylphon or bellows generally designated by the numeral 62 which is connected to the wedge shaped member 38 by virtue of a connector 64. The bellows or Sylphon 62 is connected to the adapter 30 at one end and the other end thereof is connected to a flexible tube whereby the position of the wedge-shaped member 38 is responsive to variation in pressure exerted on the Sylphon or bellows 62 such as by a form of a control device in which expansion and contraction of the control device is transmitted by a non-compressible fluid.

FIGURE 3 of the drawings illustrates a cutoff similar to the structure in FIGURE 1 but showing a modified form of expansion valve in which the expansion valve is generally designated by the numeral 66 with the diaphragm 67 being located at the top thereof but with the valve stem 68 extending through the center thereof and into an adapter body 70 connected to the body 72 of the expansion valve. The body 70 is provided with a lateral bore 74 receiving the slidable wedge shaped member 76 which engages the lower end of the valve stem 68 for effectively closing or permitting opening of the valve 78 for controlling flow of refrigerant. The wedge shaped member 76 is connected to a flexible wire 80 extending through a guide tube 82 to a control device such as the device 50 in FIGURE 1.

In the device illustrated in FIGURE 1 and also in FIGURES 2 and 4, the wedge 38 forcing itself under the tongue 40 will cause upward movement of the tongue as the tongue rides up the face of the inclined plane of the wedge and will thus engage the locking rod 34 which is forced upwardly against the diaphragm into locking position. In FIGURE 3, the tongue 40 engages the lower end of valve stem 68 and raises it against the pressure of the diaphragm into locked position. In each form of the invention, the present invention is adapted to be added to the existing valve structure by the adapter section 30 or 70 which can be added to valves already in service without disturbing the other functions or adjustments of the valve. Of course, the present invention may be built into any suitable thermostatic expansion valve as an integral part of the valve.

There are many advantages to be gained from adding an externally controlled full cutoff function to the conventional thermostatic expansion valve. For instance, the present device will replace the usual practice of providing cutoff valves in liquid lines ahead of thermostatic expansion valves which is accomplished by conventional solenoid valves. By cutting off the liquid directly at the thermostatic expansion valve, the present invention eliminates excessive length of liquid filled lines between the usual cutoff valve and the expansion valve thereby providing a positive cutoff valve more accurate and positive than the cutoff valve arranged in spaced relation to the thermostatic expansion valves.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a thermostatic expansion valve in a refrigeration system including a diaphragm operated valve member and a valve body, a cutoff device comprising an adapter body mounted on the valve body of the expansion valve, said adapter body having a longitudinal passage therein, a lock pin slidable in the passage, one end of said lock pin being engageable with the diaphragm of the expansion valve, and a slidable wedge mounted in the adapter body, the inclined surface of the wedge being in engagement with the other end of the lock pin for moving the lock pin longitudinally thereby moving the diaphragm towards a disabled position whereby the valve member of the expansion valve may move toward a closed position, and means connected to said wedge for reciprocation thereof.

2. In combination with a thermostatic expansion valve in a refrigeration system including a valve body with a valve seat therein, a valve member movable in relation to the seat and being spring biased to a closed position, an operating pin slidable in said valve body with one end engaged with the valve member for operation thereof, a diaphragm engaged with the other end of the operating pin, a control assembly comprising an adapter body mounted on the valve body of the thermostatic expansion valve, said adapter body having a longitudinal passage therein, a lock pin slidable in the passage, one end of the pin engaged with the diaphragm of the expansion valve, and a slidable wedge disposed in a lateral passage in the adapter body in engagement with the other end of the lock pin for moving the diaphragm away from the actuating pin whereby the valve member of the expansion valve may move to closed position, and means for operating said wedge, a tongue member extending into said lateral passage in opposite relation to the inclined surface of the wedge with the tongue member engaging the inclined surface and the end of the lock pin thereby preventing lateral force from being exerted on the lock pin thereby preventing binding thereof.

3. The structure as defined in claim 2 wherein said means for operating said wedge includes an elongated flexible wire connected to the wedge, said wire being received in a guide tube and connected at its other end to a control device for operating the wedge.

4. The structure as defined in claim 2 wherein said means for operating the wedge includes a solenoid with a movable core connected to the wedge whereby energization of the solenoid will move the wedge thereby moving the lock pin.

5. The structure defined in claim 2 wherein said means for operating the wedge includes a fluid pressure operated bellows connected to the wedge and communicated with a pressure source for operating the wedge.

6. In combination with a thermostatic expansion valve employed in a refrigeration system wherein the expansion valve is provided with body sections, a valve operating means carrying a valve member engageable with a valve seat for positively preventing flow of refrigerant through the expansion valve, said valve operating means including a diaphragm for moving the valve member in response to demand of a heat sensing bulb, a cutoff attachment comprising an adapter disposed intermediate the body sections of the expansion valve, said adapter having a lateral passage therein, a wedge member movably disposed in said lateral passage, said wedge member being operatively associated with said diaphragm for disabling the diaphragm when the wedge member is in one position and means connected to the wedge member for operation thereof.

7. The structure as defined in claim 6 together with a tongue member extending into said lateral passage in opposite relation to the inclined surface of the wedge member, said tongue member engaging the inclined surface of the wedge member for preventing lateral force from being exerted thereby.

8. The combination as defined in claim 6 wherein said valve operating means also includes a valve stem having one end connected with the diaphragm and having the valve member mounted thereon, said valve stem including an end portion remote from the diaphragm engaged by the inclined surface of the wedge member.

9. The structure as defined in claim 6, wherein said means connected to said wedge member for operation thereof includes an elongated flexible wire connected to the wedge member at one end, said wire being received in a guide tube and connected at its other end to a control device for operating the wedge member.

10. The structure as defined in claim 6, wherein said means connected to said wedge member for operation thereof includes a solenoid with a movable core connected to the wedge member whereby energization of the solenoid will move the wedge member thereby disabling the diaphragm.

11. The structure as defined in claim 6, wherein said means connected to said wedge member for operation thereof includes a fluid pressure operated bellows connected to the wedge member and communicated with a pressure source for operating the wedge member.

References Cited in the file of this patent

UNITED STATES PATENTS

| | | |
|---|---|---|
| 879,393 | Levilly | Feb. 18, 1908 |
| 1,740,041 | Schmidt | Dec. 17, 1929 |
| 2,297,872 | Carter | Oct. 6, 1942 |
| 2,298,253 | Dillman | Oct. 6, 1942 |
| 2,312,549 | Hiner | Mar. 2, 1943 |
| 2,363,117 | Butler | Nov. 21, 1944 |
| 2,415,338 | Carter | Feb. 4, 1947 |
| 2,550,022 | Ray | Apr. 24, 1951 |
| 2,579,034 | Dube | Dec. 18, 1951 |
| 2,665,712 | Pratt | Jan. 12, 1954 |